(12) United States Patent
Russert

(10) Patent No.: US 9,329,318 B2
(45) Date of Patent: May 3, 2016

(54) SIDE EMITTING GLASS ELEMENT

(71) Applicant: Schott AG, Mainz (DE)

(72) Inventor: Hubertus Russert, Heidenrod (DE)

(73) Assignee: SCHOTT AG, Mainz (DE)

( * ) Notice: Subject to any disclaimer, the term of this patent is extended or adjusted under 35 U.S.C. 154(b) by 177 days.

(21) Appl. No.: 13/903,666

(22) Filed: May 28, 2013

(65) Prior Publication Data
US 2013/0314940 A1 Nov. 28, 2013

(30) Foreign Application Priority Data

May 25, 2012 (DE) .......................... 10 2012 208 810

(51) Int. Cl.
*G02B 6/00* (2006.01)
*F21V 8/00* (2006.01)
*C03B 37/012* (2006.01)
*C03B 23/047* (2006.01)
(Continued)

(52) U.S. Cl.
CPC .............. *G02B 6/001* (2013.01); *B60Q 1/0041* (2013.01); *B60Q 3/004* (2013.01); *B60Q 3/0246* (2013.01); *B64D 11/00* (2013.01); *C03B 23/047* (2013.01); *C03B 23/207* (2013.01); *C03B 37/0124* (2013.01); *C03B 37/01205* (2013.01); *C03B 37/01211* (2013.01); *C03B 37/01222* (2013.01); *F21K 9/10* (2013.01); *F21K 9/52* (2013.01); *F21S 48/215* (2013.01); *F21S 48/2237* (2013.01); *F21S 48/2268* (2013.01); *F21S 48/2281* (2013.01); *G02B 6/04* (2013.01); *B64D 2011/0038* (2013.01); *B64D 2203/00* (2013.01); *F21Y 2101/02* (2013.01); *Y02T 50/46* (2013.01)

(58) Field of Classification Search
CPC ................... C03B 37/01205; C03B 37/01211; C03B 37/01222; C03B 37/0124; C03B 23/047; C03B 23/207; C03C 14/00; C03C 14/004; F21S 48/2237; F21S 48/2268; G02B 6/001
See application file for complete search history.

(56) References Cited

U.S. PATENT DOCUMENTS 3,224,851 A    12/1965   Hicks, Jr.
3,930,714 A *   1/1976   Dyott ............................ 385/123
(Continued)

FOREIGN PATENT DOCUMENTS

DE         1772354 B1    11/1970
DE   102005063208 A1    7/2007
(Continued)

OTHER PUBLICATIONS

British Combined Search and Exam Report dated Oct. 23, 2013 corresponding to GB Patent App. 1308532.9, 4 pp.
(Continued)

*Primary Examiner* — Y M Lee
(74) *Attorney, Agent, or Firm* — Ohlandt, Greeley, Ruggiero & Perle, LLP

(57) ABSTRACT

Side emitting glass elements are provided that include a plurality of light guiding elements, which are inseparably connected to one another at their outer circumferential surfaces, and at least one scattering element. The scattering element is inseparably connected to the outer circumferential surface of at least one light guiding element. The light guiding elements have at least one glass with a refractive index $n_1$, wherein the individual light guiding elements are not enclosed by a cladding. A phase boundary is present between the light guiding elements through which the guided light can pass and to reach the scattering element.

18 Claims, 7 Drawing Sheets

(51) Int. Cl.

| | |
|---|---|
| *C03B 23/207* | (2006.01) |
| *B60Q 1/00* | (2006.01) |
| *B60Q 3/00* | (2006.01) |
| *B60Q 3/02* | (2006.01) |
| *F21S 8/10* | (2006.01) |
| *G02B 6/04* | (2006.01) |
| *F21K 99/00* | (2016.01) |
| *B64D 11/00* | (2006.01) |
| *F21Y 101/02* | (2006.01) |

(56) References Cited

U.S. PATENT DOCUMENTS

| | | |
|---|---|---|
| 4,466,697 A | 8/1984 | Daniel |
| 2011/0103757 A1 | 5/2011 | Alkemper et al. |

FOREIGN PATENT DOCUMENTS

| | | |
|---|---|---|
| DE | 102008009137 A1 | 8/2009 |
| DE | 102009039556 A1 | 3/2010 |
| DE | 102011084062 | 4/2013 |
| EP | 2383590 A1 | 11/2011 |
| JP | H09258028 | 10/1997 |
| JP | 2007137753 A * | 6/2007 |
| WO | 2009/100834 | 8/2009 |

OTHER PUBLICATIONS

British Combined Search and Exam Report dated Oct. 23, 2013 corresponding to GB Patent App. 1308532.9, 2 pp.
English translation of a German Office Action dated Nov. 26, 2012 corresponding to DE Patent App. 10 2012 208 810.5, 4 pp.
English translation of a German Office Action dated Nov. 26, 2012 corresponding to DE Patent App. 10 2012 208 810.5, 3 pp.

* cited by examiner

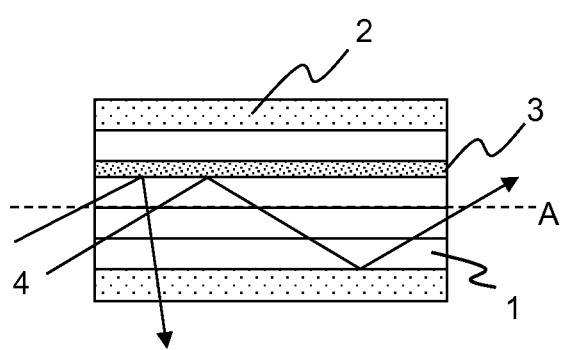
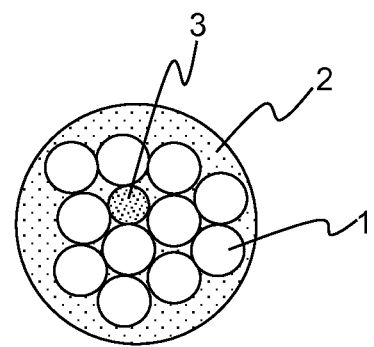
Fig. 1a　　　　　　　　　Fig. 1b
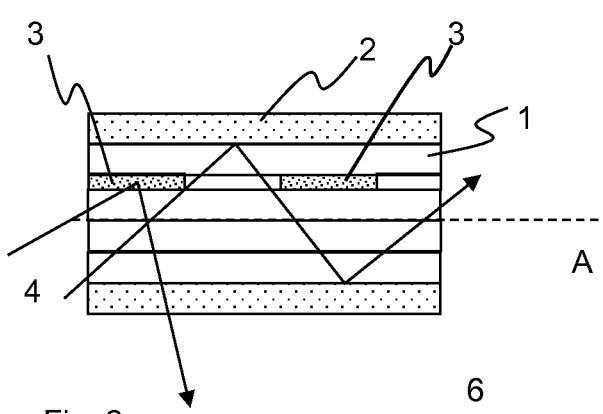
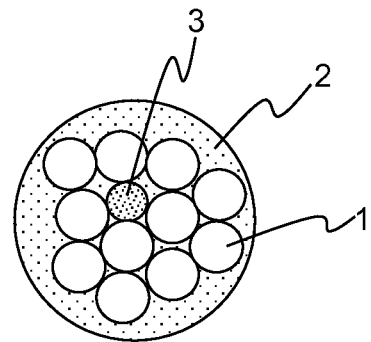
Fig. 2a　　　　　　　　　Fig. 2b

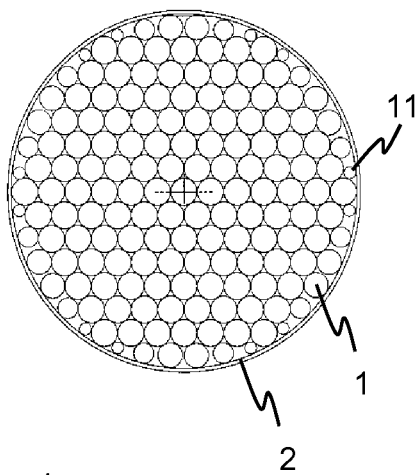
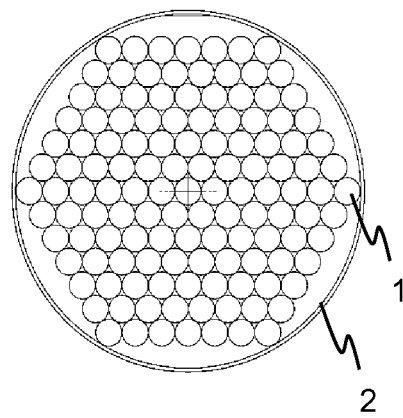
Fig. 4a　　　　　　　　　　Fig. 4b
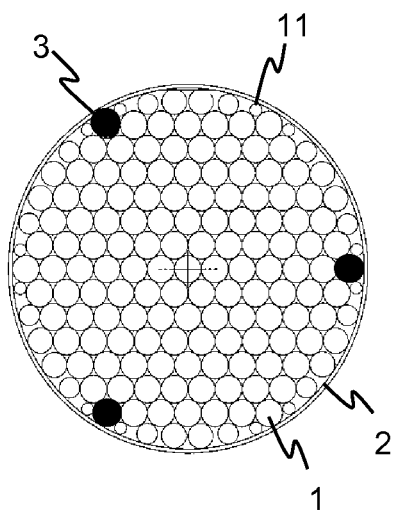
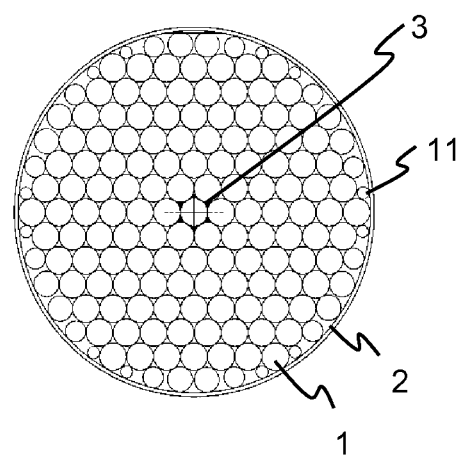
Fig. 5a　　　　　　　　　　Fig. 5b

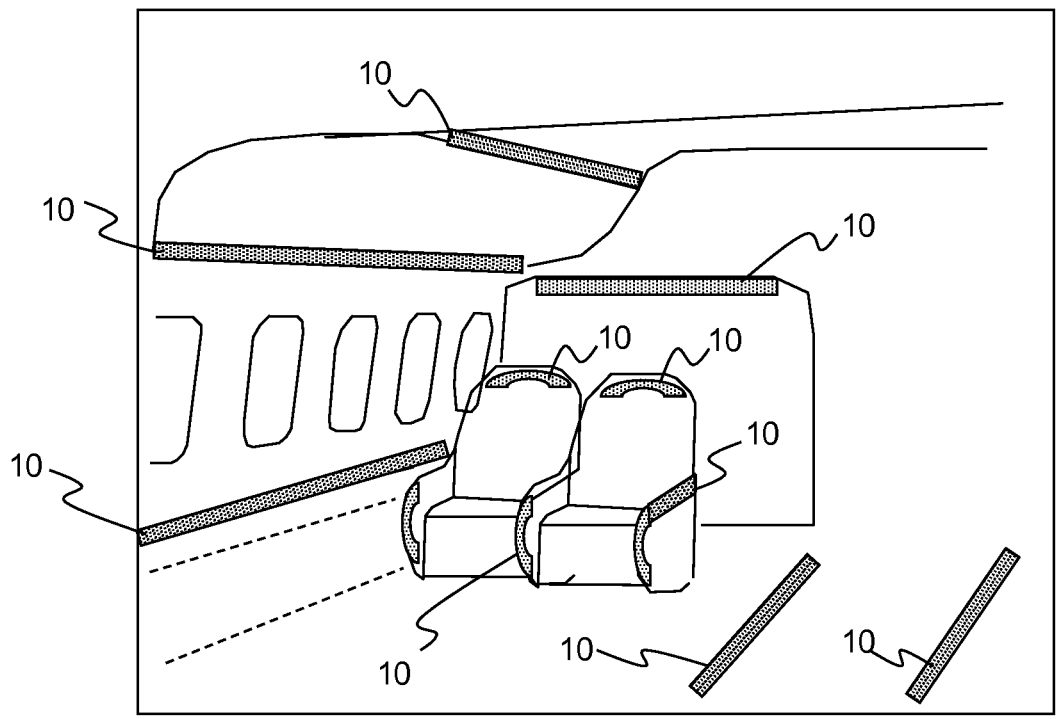
Fig. 8
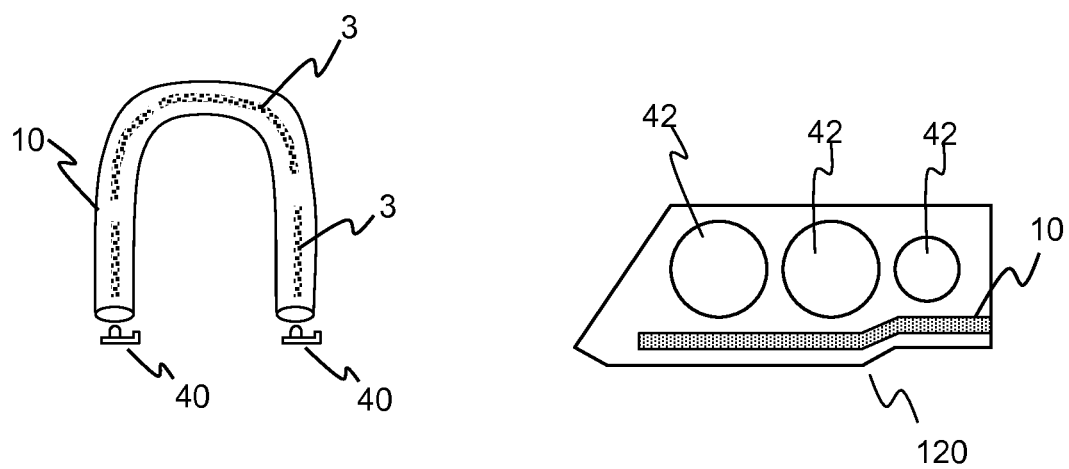
Fig. 9
Fig. 10

SIDE EMITTING GLASS ELEMENT

CROSS REFERENCE TO RELATED APPLICATIONS

This application claims benefit under 35 U.S.C. §119(a) of German Patent Application No. 10 2012 208 810.5, filed May 25, 2012, the entire contents of which are incorporated herein by reference.

BACKGROUND OF THE INVENTION

1. Field of the Invention

The invention relates to a side emitting glass element which laterally emits portions of the light guided in it, a method for producing said glass element, and the use thereof. Such side emitting glass elements are required for example for lighting applications, be it decorative lighting, signal lighting or the illumination of spaces.

2. Description of Related Art

The light guiding effect of light guided in glass elements is based on the principle of total reflection of the guided light at a medium which surrounds the glass element and which has a lower refractive index. Total reflection occurs when the surrounding medium has a lower refractive index than the glass element guiding the light. However, the condition of total reflection is possible only up to a critical angle of the light impinging on the medium, said angle being dependent on the refractive indices of glass element and surrounding medium. The critical angle $\beta_{Min}$, i.e. the smallest angle at which total reflection still occurs, can be calculated by $\sin(\beta_{Min})=n_2/n_1$, where $\beta_{Min}$ is measured from a plane perpendicular to the axis of the main direction of light guiding, $n_1$ represents the refractive index of the glass element and $n_2$ represents the refractive index of the medium. The surrounding medium can usually be either air, but also a glass cladding.

It is usually endeavoured to guide the light as well as possible in a light guiding element, that is to say that the intention is to lose as little light as possible during coupling into the element and during transport in the element. In a side emitting glass element, however, light is intentionally coupled out from the glass element and out of the latter. In general, a uniform coupling-out is desirable which, in the ideal case, causes a side emitting glass element to appear as a uniformly luminous strip or line. This makes it of interest for diverse applications particularly in lighting technology.

Side emitting in the sense of the invention means that the glass element is able to guide light but also to emit light laterally, independently of whether it is in operation, that is to say whether a light source is actually connected and the light is switched on.

Various methods for producing the effect of side emission in light guides are known from the prior art particularly with regard to fibres. One known method is to provide for a coupling-out of light in the fibre core.

The published Japanese patent application JP 9258028 A2 discloses side emitting stepped-index fibres in which the coupling-out of light is intended to be produced by means of a non-round core. The coupling-out is affected if light impinges on the interface between fibre core and cladding at angles which are less than the critical angle of total reflection $\beta_{Min}$. As a result of the non-round core geometries described, for example, square, triangular or star shapes, geometrical regions in which light that is otherwise guided by total reflection can be coupled out are produced in the core. The production of side emitting fibres by means of such core geometries is beset by the problem, however, that the coupling-out of the light is very inefficient in this case. The light is guided in the fibre substantially at very shallow angles of incidence with respect to the cladding, and the core geometries described extend along the fibre axis. Accordingly, there are hardly any areas at which $\beta_{Min}$ is undershot. Furthermore, it is very complicated to use the core geometries disclosed in JP 9258028 A2 for fibres composed of glass, because it is very difficult to produce corresponding preforms such as are required for fibre drawing. Furthermore, precisely in the case of glass fibres, the breaking strength of such fibres having non-round fibre core diameters is greatly reduced. It is probably for this reason that said document also only discloses fibres composed of polymers.

A further method for coupling out the light from a fibre core is described in U.S. Pat. No. 4,466,697. Accordingly, particles that reflect and/or scatter light are mixed into the otherwise homogeneous fibre core. In this case, it proves to be difficult to produce relatively long fibres having uniformly side emitting properties since the light guiding in the core is attenuated by the admixed particles in the core by absorption since there are no particles which effect total scattering, but rather only those which only almost scatter the entire impinging light. Since, with particles distributed uniformly in the core, the probability is very high that the light guided in the core will impinge on such particles, the probability of absorption is also very high, even if the total number of particles is small. This means that the coupling-out effect can also be scaled only with very great difficulty, which makes reproducible results complicated to almost impossible.

Scalability in the sense of the present disclosure is understood to mean the possibility of the targeted setting of the side emission effect over the length of the glass element. This is necessary because the lengths thereof can vary very greatly for different applications, but the intention is to achieve a light emission intensity that is as uniform as possible over the entire length of the element.

As an alternative to coupling out the light directly from the fibre core, side emitting properties in fibres can also be caused by effects in the interface between fibre core and cladding. WO 2009/100834 A1 provides for introducing scattering regions in the interface between core and cladding of a fibre. For this purpose, a corresponding material is melted onto the fibre core during fibre drawing. As a result of the contact between the scattering regions and the fibre cladding, a very efficient lateral coupling-out of light is effected, and the scattering regions themselves are protected by the surrounding material and are an integral part of the fibre. The side emitting light guiding fibres in the document just cited make it possible to produce flexible and relatively long side emitting light guides. However, experiments have revealed that if rigid light guides are produced with this solution, they usually have thousands of laterally emitting individual fibres which are mutually superimposed on one another and thus reduce the efficiency of the lateral emission and only a side emission profile extending radially along the fibre axis can be achieved. Rigid fibres that emit laterally into specific defined solid angles therefore cannot be produced or can at most be produced in an unfavourable manner. Moreover, a disadvantageous colour bleed effect can be observed, which occurs when white light is radiated into such rigid fibres. Said effect is presumably caused by the very small dimensions of the scattering centres used.

Rigid glass elements that emit laterally into defined solid angles are disclosed by DE 10 2011 084 062 A1, in the case of which glass elements a glass rod is provided with a colour coating on its outer circumference, e.g. by printing. This solution has the disadvantage that the coated glass rod can no longer be subjected to hot processing, that is to say that said rod can no longer be brought to a different form after coating. Moreover, the layer is sensitive. Alternatively, the glass rod may be coated after it has been subjected to hot forming, but this places higher demands on the coating technology and thus increases the production outlay in an unacceptable manner for many applications.

SUMMARY

Against this background, the object of the invention is to provide a side emitting glass element in which the location of the lateral emission can be set in a targeted manner, which can be subjected to hot processing, can be implemented in a rigid fashion, causes axial colour shifts as little as possible and which can be produced with little outlay.

The side emitting glass element according to the invention comprises a plurality of light guiding elements, which are inseparably connected to one another at their outer circumferential surfaces, and at least one scattering element. The scattering element is inseparably connected to the outer circumferential surface of at least one light guiding element. The light guiding elements consist of at least one glass having the refractive index $n_1$, wherein the individual light guiding elements are not enclosed by a cladding. According to the invention, a phase boundary is present between the light guiding elements, that is to say that the light guiding elements are advantageously not completely fused together during the production of the glass element. In a section transversely with respect to the longitudinal axis of the glass element, the light guiding elements are thus distinguishable from one another. When light is guided in the glass element, the light guiding is effected in the light guiding elements along the main direction of the light guiding, which generally runs parallel to the principal axis of the glass element. By means of the interconnected regions of the light guiding elements, a portion of the guided light can pass through the phase boundary obliquely or perpendicularly and thus reach the scattering element. The scattering element then ensures that the light impinging on it, or at least a portion of it, is emitted laterally from the glass element. In particular, the side emitting glass element according to the invention is rigid.

With other words, the phase boundary can be considered to provide a balance between the light guiding properties and the ability to let light pass to the scattering element. Without the phase boundary, the light guiding effect would decrease and working light guides with side-emitting properties in nameable lengths would be hard to achieve.

The absence of a cladding of the individual light guiding elements and the presence of the phase boundary distinguish the glass element according to the invention from side emitting stepped-index fibres in accordance with the prior art. According to the solution according to the invention, the cladding around the individual light guiding elements would impede the guided light from passing through and would reduce the efficiency of the side emission, if not even make it impossible.

In the sense of the invention, a plurality of light guiding elements are understood to mean at least two. Dozens to hundreds or even thousands or more of light guiding elements are usually used according to the invention. The inseparable connection between the light guiding elements likewise distinguishes the glass element according to the invention from a fibre bundle of side emitting stepped-index fibres from the prior art, in which said fibres lie loosely alongside one another. The described crosstalk of guided light, such as is made possible by the interconnected outer circumferential surfaces of the light guiding elements and the phase boundaries situated there between, is precisely not intended to occur in such stepped-index fibres.

In the sense of the invention, outer circumferential surface is understood to mean the outer region of the light guiding elements along the principal axis thereof; in particular the end faces are not encompassed thereby. When expressed in a simplified manner, the side emitting glass element according to the invention is formed by the sum of the light guiding elements which are arranged substantially parallel to one another and into or onto which the at least one scattering element is incorporated and/or attached. How much light can be coupled out laterally from the glass element is principally governed by the number of scattering elements contained. As a result, the effect of the side emission is scalable. In order to obtain a glass element, light guiding elements and scattering elements consist of glass.

Preferably, the light guiding elements of the glass element according to the invention are connected to one another in a form-fit manner. The same applies to the at least one scattering element. This has the advantage that guided light can cross particularly effectively from one light guiding element into the other and into the scattering element and a very efficient side emission thus becomes possible. Moreover, as a result of the form-fit connection, there are no interstices between the light guiding elements into which contaminants could penetrate into the glass element and/or which can lead to undesirable optical effects. In particular, light guiding and scattering elements connected to one another in a form-fit manner can have a hexagonal cross section.

It is likewise preferred for the side emitting glass element according to the invention to be enveloped along its outer circumferential region with a cladding glass having the refractive index $n_2$. In particular, $n_2<n_1$ holds true here because, as a result, the total reflection of light guided in the glass element can be achieved and the required light guiding properties can thus be obtained in the best way for many applications. Said cladding glass also protects the light guiding elements and/or the scattering elements, e.g. from aggressive media and/or mechanical damage.

The diameters of the individual light guiding elements are not necessarily identical in a glass element according to the invention. Rather, light guiding elements having different diameters can be contained. Light guiding elements having at least two different diameters have proved to be readily usable in a side emitting glass element according to the invention. This means that a specific number of light guiding elements can have the diameter $d_1$ while the others have the diameter $d_2$. The light guiding elements having the smaller diameter can advantageously fill the empty spaces between the light guides having the larger diameter, such that a glass element without interstices can be produced in an efficient manner. In the case of non-round cross sections of the light guiding elements, the maximum extent of the cross section is understood as diameter.

The diameters of the light guiding elements and also of the scattering elements within the glass element are preferably adapted to the diameters of the glass element. It generally holds true that the larger the diameter of the glass element, the larger the diameter of the light guiding elements therein. This and/or the exact dimensions can, however, also be dependent on the illumination profile of the lateral emission that is to be obtained.

The at least one scattering element preferably comprises a glass having scattering centres that are preferably formed by scattering particles incorporated into the glass and/or by inhomogeneous regions. The inhomogeneous regions can arise in particular by phase separation and/or segregation of the glass. In the sense of the invention, scattering centres are all particles and/or material agglomerations and/or inhomogeneous regions, no matter what form, what material and/or what size, which can scatter the guided light. The scattering centres can manifest their scattering effect by traditional scattering, in particular Rayleigh and/or Mie scattering, and likewise by diffraction and/or reflection and multiple processes of these mechanisms among one another. Their function is merely to deflect impinging light individually or in their sum.

If scattering particles are used as scattering centres, these can advantageously have a diameter of between 10 nm and 5000 nm, particularly advantageously between 100 nm and 1200 nm. For non-round scattering particles, their maximum extent is understood as diameter in the sense of the invention. The scattering particles can be selected from a multiplicity of materials. Preferably, they consist substantially of $SiO_2$ and/or BaO and/or MgO and/or BN and/or AlN and/or SN and/or $ZrO_2$ and/or $Y_2O_3$ and/or $Al_2O_3$ and/or $TiO_2$ and/or Ru and/or Os and/or Rh and/or Ir and/or Ag and/or Au and/or Pd and/or Pt and/or diamond-like carbon and/or glass ceramic particles. Mixtures of scattering particles composed of different materials, compounds and/or conglomerates thereof or else scattering particles that are sintered and/or fused together are likewise conceivable and encompassed by the invention, as are the metallic components of the abovementioned oxides and nitrides alone.

If scattering particles are used as scattering centres, the refractive index $n_3$ of the glass into which they are incorporated advantageously has approximately the same value as $n_1$ of the glass of the light guiding elements. A refractive index $n_3$ deviating significantly from $n_1$ would lead to a reduction of the efficiency of the side emission. If the refractive index $n_3$ is substantially equal to the refractive index $n_1$, the light guiding in the light guiding elements is disturbed the least. Consequently, an efficient scaling of the lateral emission is also possible by way of the choice of the concentration of the scattering particles in the scattering elements. A concentration of the scattering particles in the range of 10 ppm to 1000 ppm, in particular of 20 ppm to 100 ppm, is particularly advantageous. The concentration indication in ppm in this case refers to the proportion of the scattering particles in relation to the mass proportions of the constituents of the glass in which the scattering particles are incorporated. However, it is also possible and advantageous if $n_3$ is greater than $n_1$ so that the condition $n_3 \geq n_1$ is met.

If inhomogeneous regions of the glass of the scattering elements serve as scattering centres, an alternative embodiment of the invention arises in which the inhomogeneous regions are preferably formed by phase separation and/or segregation of the glass components of the glass into which they are incorporated. The scattering centres formed by inhomogeneous regions preferably have a diameter of 10 nm to 1000 nm, particularly preferably of 100 nm to 800 nm. Said scattering centres are particularly advantageously spherical. For non-spherical scattering centres, their maximum extent is understood as diameter in the sense of the invention.

The glass in which the inhomogeneous regions are incorporated as scattering centres can preferably consist of an As- and Pb-containing silicate glass. In this case, the scattering centres preferably have an increased content of Pb and/or As relative to the surrounding glass matrix. Alternatively, the glass into which the inhomogeneous regions are incorporated as scattering centres can consist of a fluorine-containing Ca—Zn silicate glass. The scattering centres then preferably have an increased content of fluorine relative to the surrounding glass matrix. Particularly advantageously, the refractive index $n_3$ of the glass into which the scattering centres are incorporated is at least equal to or greater than the refractive index $n_1$ of the light guiding elements, that is to say that the condition $n_3 \geq n_1$ is particularly advantageously fulfilled.

As in the case of the scattering particles as scattering centres, in the case also of the inhomogeneous regions as scattering centres, besides the scattering property of the inhomogeneous regions themselves as an intrinsic parameter, the efficiency of the lateral coupling-out of light from the side emitting glass element is dependent on the concentration of the inhomogeneous regions in the glass element as a whole. It has been established that concentrations of the inhomogeneous regions in the scattering elements of between 1% and 80% enable an efficient coupling-out, the most favourable range being between 10% and 50%. The concentration indication in % in this case refers to the proportion of the inhomogeneous regions in relation to the mass proportions of the constituents of the glass of the scattering elements in which the inhomogeneous regions are incorporated.

Taken as a whole, the parameters with which the side emission effect can preferably be set and thus scaled are the number of scattering elements in the glass element, the scattering properties of the scattering centres used and the concentration thereof and also the choice of the refractive indices $n_1$ and $n_3$. Suitable combination of these parameters makes it possible to produce side emitting glass elements of a wide variety of lengths which appear largely homogeneous to the human eye, with the result that a multiplicity of applications actually become possible in the first place.

The position of the at least one scattering element in the glass element and thus the position thereof in relation to the light guiding elements determines the geometrical properties of the side emission, in particular the lateral emission profile, that is to say into which solid angle the guided light is laterally emitted. The at least one scattering element can be situated at the edge of the glass element, but can preferably be enclosed by the cladding glass, or else can be surrounded by the light guiding elements at arbitrary locations in the interior of the glass element.

The invention likewise encompasses lighting devices comprising the side emitting glass element described herein. Such a lighting device comprises, alongside the side emitting glass element, a light source, which radiates light into the glass element in the operating state. As described, the glass element has light guiding and side emitting properties, such that preferably at least 50% of the light radiated in is emitted laterally out of said glass element. The glass element is thus perceived by an observer preferably as a luminous strip, or as a glass body containing a luminous strip or at least luminous structures. The actual proportion of the laterally emitted light can be simply scaled and adapted to the requirements in a glass element according to the invention, such that the production of the glass element as will be described takes place according to these requirements. However, other side emitting ratios are possible, such as 40% or 30% or 20%.

All suitable light sources can be used as light source. LEDs are particularly suitable. Radiation is generally introduced into the end face of the glass element. In the embodiment which provides a cladding glass enclosing the glass element along its outer circumferential surface, said cladding glass does not cover the end face. Whether further optical devices, e.g. lenses and/or other light guides, are arranged between light source and end face can vary depending on the application. Particularly preferably, in the operating state, light from a light source is coupled into each end face. It is likewise possible to provide the end faces of the glass element with suitable coatings, for example IR protective filters, antireflection coatings, etc.

Point light sources are particularly advantageous as light source, said point light sources, for optimal luminous efficiency, focusing the light by means of an attachment optical unit in such a way that the light is radiated in within the acceptance angle specific to the glass element. On account of their compact design and comparatively high luminous efficiency, primarily LEDs, in particular white-light LEDs or RGB-LEDs, are proposed as light source. A matrix of LEDs can also advantageously be used, wherein the matrix geometry is adaptable to the geometry of the end face of the glass element, and vice versa. Also the application of laser diodes is possible. The scattering centres could also server as converter for radiation impinging on it, so that shorter wavelength radiation from the light source could be converted into longer wavelength, with the effect that the colour spectrum of the side emitted light could be different and/or shifted from the emission spectrum of the radiation source.

Different purposes for application of the lighting device according to the invention require different illumination profiles. The profile of the lateral emission corresponds to the space illuminated by the lateral emission. For the lighting device according to the invention, these requirements mean that it has to enable different profiles of the lateral emission. DE 10 2011 084 062 A1 describes e.g. a lighting device comprising a printed glass rod as light guide, which lighting device can replace fluorescent tubes. The required emission profile is a stripe which extends along the longitudinal axis of the glass element and thus illuminates a spatial region perpendicularly from said longitudinal axis. Such an illumination profile can be achieved by the arrangement of scattering elements in the edge region of the glass element. A radially symmetrical illumination profile can be obtained by the central and/or radially symmetrical arrangement of scattering elements in the glass element.

The production of a glass element according to the invention having scalable side emitting properties and a profile of the lateral emission that is adapted to the purpose of application constitutes a serious problem. Therefore, the method for producing a glass element according to the invention is likewise an essential part of the invention.

The method according to the invention involves providing a plurality of light guiding rods composed of a glass having the refractive index $n_1$. Depending on the illumination profile to be achieved, scattering rods composed of a glass comprising the described scattering centres in a required number are provided and arranged alongside the light guiding rods, thereby giving rise to a matrix of light guiding rods and scattering rods in which the longitudinal axes of light guiding rods and scattering rods are advantageously arranged parallel to one another to the greatest possible extent. The distribution of the scattering rods in the matrix is effected according to a pattern dependent on the desired illumination profile. Said matrix is fixed by suitable means and thus forms a preform.

In a subsequent method step, the preform is heated and drawn out to form the side emitting glass element such that the light guiding rods and the at least one scattering rod combine inseparably with one another at their outer circumferential surfaces. The temperature control during drawing-out also has the effect that a phase boundary remains present between the light guiding elements. This can be achieved, in particular, by the drawing temperature being kept below the melting point of the glass of the light guiding elements and the latter being sintered together in particular at the sintering temperature. A complete fusion of the light guiding rods is avoided according to the invention. The preferred form-fit connection of the light guiding elements and, as necessary, also of the scattering elements is likewise achieved by means of the temperature control.

In one advantageous embodiment, the light guiding elements, as described, are not totally fused together, and, moreover, the scattering element is not totally fused to at least one light guiding element. A phase boundary can now also be present between the scattering element and the light guiding elements. This embodiment can be achieved by the softening temperature of the glass of the light guiding rods being equal to or lower than the softening temperature of the scattering rods.

In a likewise advantageous embodiment, it is provided that the light guiding elements are not totally fused to one another and a phase boundary is present between them, but the at least one scattering element is melted onto at least one light guiding element. This can be achieved by the softening temperature of the glass of the scattering rods being lower than that of the glass of the light guiding rods. A softening temperature of the glass of the scattering rods that is up to 50 K lower has proved to be advantageous, in particular a softening temperature that is up to 30 K lower.

During the drawing-out process, the light guiding rods become the light guiding elements and the scattering rods become the scattering elements of the glass element. The light guiding rods therefore consist of a glass having a refractive index $n_1$ and more specifically are not enclosed by a cladding glass having the refractive index $n_2$.

The means for fixing the matrix composed of light guiding rods and scattering rods can be clamps, for example, which are removed again afterwards. However, preference is given to using an enveloping tube consisting of a glass having the refractive index $n_2$. In this embodiment, the matrix of the light guiding rods and scattering rods is arranged in the interior of the enveloping tube. Particularly preferably, the enveloping tube is closed on one side. The enveloping tube embraces the above-described preform at least along the outer circumference thereof. During heating and drawing-out, the enveloping tube softens and settles on the matrix composed of light guiding rods and scattering rods, thus forming the cladding around the glass element. The product obtained by heating and drawing-out can also be divided and/or processed further in order to obtain the side emitting glass element.

A side emitting glass element according to the invention can be used in particular for general lighting. This encompasses use for lighting interiors and/or facades in architecture. In particular, the glass elements according to the invention in suitable lighting devices can replace fluorescent tubes. This encompasses use in building installation technology, e.g. for escape route markers, corridor lighting systems, etc. Also advantageous is use in water conditioning systems and in devices appertaining to medical technology, e.g. for irradiating samples with visible light, as a functional indicator in X-ray/irradiation devices, and/or in an environment appertaining to medical technology, e.g. coloured lighting in an operating theatre, as ambient lighting in recovery rooms, etc.

Owing to the hot formability of the glass element, the latter can be correspondingly shaped and fitted along contours of interior components, for example passages, carrier elements, contours of buildings, etc. and can be connected to suitable light sources. It is thus possible to reproduce the contours of a building or parts of a building by means of the glass element and realize a linear or curved or arbitrarily shaped light source.

The glass element according to the invention can particularly advantageously be used for the lighting of interiors of vehicles, in particular of automobiles, aircraft, ships and/or trains. In this case, the glass element can be fitted to arbitrary locations or be inserted in contours of these interiors. If light is coupled into the side emitting glass element, the latter preferably appears as a luminous strip or luminous line. By virtue of the glass element being designed such that it only comprises flame-retardant substances, it can comply with very strict fire safety provisions and/or requirements with regard to thermal stability. That makes it particularly suitable for use in all kinds of vehicles. In automobiles, one preferred location for fitting a glass element according to the invention may be a door interior trim, for example, in which a lighting function can be integrated. In the case of aircraft and ships, the replacement of the fluorescent tubes by the glass elements is afforded. In aircraft and ships, the glass element according to the invention can advantageously be used for cabin lighting and/or for marking escape routes.

It is likewise advantageous to use the fibre bundle according to the invention as part of furniture, in particular of cupboards, display cabinets, ovens, landscaped interiors and/or work space lighting.

In automotive engineering, in particular, the headlights are increasingly also being used to produce a level of distinctiveness for recognition of the manufacturer by means of special lighting devices. Therefore, some automobile headlights have sidelight rings which surround the dipped beam and appear as a largely homogeneously luminous ring when the light is switched on. Other manufacturers use for example a strip of LEDs in their headlights. The side emitting glass element according to the invention can likewise be used in headlights, in particular in headlights of automobiles, or especially other daytime running light embodiments of automobiles. The glass element according to the invention makes it possible to produce any desired, preferably homogeneously luminous structures in headlights. For various reasons, LEDs are also increasingly finding applications in automobile headlights. Compared with LEDs arranged in strips, this use of the glass element according to the invention has the advantage that a small number of LEDs suffice to produce the illumination. Furthermore, compared with a strip of LEDs, no individual points of light are visible, which may also be preferred for design reasons. Moreover, one or a plurality of LEDs can be coupled into the end face of the glass element according to the invention. It is thus possible to obtain the function as a position light within headlights, which in return include for example the applications as sidelight and/or as daytime running light. By virtue of the fact that the glass element according to the invention is hot-formable, virtually any desired shapes and thus luminous contours can be produced efficiently and with little production outlay.

A further possible use of the glass element according to the invention is the position lighting of vehicles, ships and/or trains. It is also possible to use the glass element according to the invention for lighting runways for aircraft, for example aeroplanes, helicopters, airships, etc. Hitherto, runways have been illuminated by a multiplicity of incandescent lamps arranged in a series. Said lamps have a limited lifetime, for which reason, in such a series, the incandescent lamps that have failed have to be replaced again and again in the course of operation of the airport. If the glass element according to the invention is arranged along the runway and/or else in the centre thereof, a linear luminous structure is produced which marks the position of the runway in darkness and/or conditions of poor visibility. The lighting source can couple the light into the glass elements at a few central locations, which, in the case of the coupling of the glass element by further light guides, do not even have to be situated in direct proximity to the runway. The glass element according to the invention is maintenance-free to the greatest possible extent, such that the maintenance of this runway lighting is limited to the small number of light sources used. In this way, it is possible to mark for example the takeoff and landing strips of airports, but also those of aircraft carriers, helicopter landing pads and other aircraft. The same applies to watercraft and the landing places thereof, e.g. ferry terminals.

A further possible application of the described glass element encompassed by the invention is backlighting of displays. Displays can be all kinds of display devices, but preferably flat screens, for example computer monitors, tablet computers, flat screen televisions and the displays of mobile telephones and PDAs (Personal digital Assistants). Hitherto, large-format displays requiring backlighting have been illuminated by fluorescent tubes arranged at the edge of the display or else behind the display area of the display. It is desirable for the display area to be illuminated as homogeneously as possible, for which reason a diffuser plate is usually situated between fluorescent tubes and display area, which diffuser plate homogenizes the light emitted by the fluorescent tubes. In diffuser plates, the light can also be coupled in laterally, for example if the fluorescent tubes are arranged at the edge of the display. The diffuser plate then acts as a light guide. In the case of relatively small displays, for example displays of mobile telephones and/or PDAs, light from LEDs is usually coupled into the diffuser plate laterally. In the case of relatively large displays, LED lighting is increasingly being used of late because it is more cost-effective than lighting using fluorescent tubes. The problem with the use of LEDs is that of being able to realize a sufficiently homogeneously illuminated luminous area therewith. This can be remedied by the glass elements according to the invention. If they are installed in suitable structures behind the display area, as necessary behind a diffuser plate or alternatively without the latter, LEDs can couple light into the end faces of the glass elements, with the result that the glass element(s) having side emitting properties provide(s) for the backlighting of the display. If the arrangement of the glass element is coordinated with the intensity profile of the laterally emitted light, a large-area homogeneous backlighting for displays can thus also be obtained in a cost-effective manner. It is also possible to produce with the glass element according to the invention a surface element in which the scattering regions are arranged such that it can replace a diffuser plate.

DESCRIPTION OF THE DRAWINGS

The invention will furthermore be explained with reference to the accompanying drawings, in which:

FIG. 1a: illustrates the longitudinal section along the longitudinal axis of a side emitting glass element according to the invention.

FIG. 1b: illustrates the cross section of a side emitting glass element according to the invention.

FIG. 2a: illustrates the longitudinal section along the longitudinal axis of a side emitting glass element according to the invention with a scattering element having scattering centres in sections along the longitudinal axis.

FIG. 2b: illustrates the cross section of a side emitting glass element according to the invention in accordance with FIG. 2a.

FIG. 4a: illustrates a section transversely with respect to the longitudinal axis through a preform including light guiding rods having different diameters.

FIG. 4b: illustrates a section transversely with respect to the longitudinal axis through a preform including light guiding rods having identical diameters.

FIG. 5a: illustrates a section transversely with respect to the longitudinal axis through a preform including light guiding rods having different diameters and scattering rods in a radially symmetrical edge configuration.

FIG. 5b: illustrates a section transversely with respect to the longitudinal axis through a preform including light guiding rods having different diameters and scattering rods in a radially symmetrical central configuration.

FIG. 8: illustrates an aircraft interior with applications of side emitting glass elements according to the invention.

FIG. 9: illustrates a lighting device comprising a hot-formed side emitting glass element.

FIG. 10: illustrates an automobile headlight comprising a side emitting glass element as daytime running light.

Figure 3:
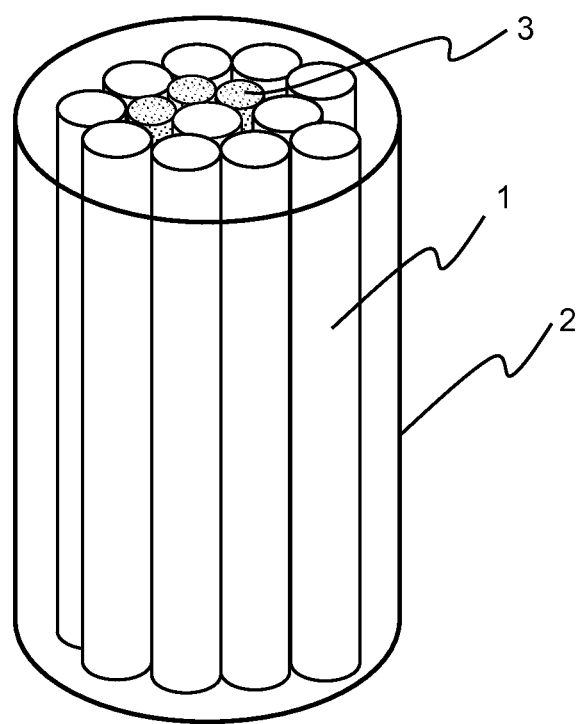
FIG. 3: illustrates a preform for producing a side emitting glass element according to the invention.

All the drawings are schematic, the diameters of their elements are not to scale, and the size relationships of all elements among one another can also deviate from the drawings in the real objects.

DETAILED DESCRIPTION

FIG. 1a schematically shows the longitudinal section along the longitudinal axis A of a side emitting glass element according to the invention. This glass element comprises a scattering element (3) composed of a glass, in which scattering particles produced or incorporated by segregation and/or phase separation are present as scattering centres and which is situated between light guiding elements (1) composed of glass having the refractive index $n_1$. There is a phase boundary between the individual light guiding elements (1) through which a portion of the guided light can pass through and reach the scattering element (3). The cladding (2) composed of glass having the refractive index $n_2$ encloses the glass element along its longitudinal axis (A). Light coupled into the glass element can pass through the phase boundary of the individual light guiding elements (1) and thus from one light guiding element (1) into others and thus reach the scattering element (3). It is coupled out from the glass element towards the outside by the scattering centres in the scattering element (3), as a result of which the side emission effect arises. In the absence of the scattering element (3), the condition of total reflection would otherwise be fulfilled for many angles of incidence and the glass element would guide the light in the light guiding elements (1). The scattering of the light (4) at the scattering centres present in the scattering elements (3) is responsible for the coupling-out of the light (4). Since the material of this region (3) in whose matrix the scattering centres are incorporated preferably has the same refractive index $n_1$ as the material of the core (1), the light (4) can pass from the matrix material to the scattering particles largely without being impeded. As a result of single or multiple interaction with the scattering centres, the light can be deflected from its original angle of incidence by the scattering centres, with the result that the impingement angle on the cladding (2) is reduced such that light can couple out from the glass element. If the angle of incidence on the cladding (2) is greater than the critical angle of total reflection $\beta_{Min}$, back-reflection into the light guiding elements (1) and hence light guiding in the glass element take place.

The fact that in this exemplary embodiment the cladding (2) encloses the glass element along the axis (A) becomes readily apparent with reference to the depiction of the schematic cross section in FIG. 1b. This likewise illustrates the fact that the scattering element (3) is arranged between the light guiding elements (1). The light guiding elements (1) and the scattering element (3) are non-reasonably connected to one another at their contact areas, even though here there is no form-fit connection between the elements (1, 3).

In schematic FIGS. 2a and 2b, the scattering element (3) with the incorporated scattering centers is configured such that it has alternately regions of incorporated scattering centres which extend along the axis (A) and alternate with regions. If the light (4) guided in the light guiding elements (1) impinges on regions with incorporated scattering centres (3), the light (4) can be coupled out from the glass element with a specific probablity in accordance with the mechanisms described above. However, if the light (4) guided in the light guiding elements (1) impinges on regions without incorporated scattering centres, it passes through these regions largely without being impeded and can be guided by total reflection at the cladding (2) in the glass element. By means of targeted setting of the interval between the regions of the scattering element (3) with incorporated scattering centres and the regions without incorporated scattering centres, it is possible to set the amount of light coupled out. As already described, however, other parameters are also responsible for the efficiency of the coupling-out.

FIG. 3 shows a preform suitable for producing a side emitting glass element according to the invention. It is thus necessary as a preliminary product of the side emitting glass element according to the invention. The preform includes a plurality of light guiding rods (1) and a plurality of scattering rods (3), which are arranged between the light guiding rods (1) in accordance with the illumination profile to be obtained. The light guiding rods (1) and the scattering rods (3) are surrounded by an enveloping tube (2). In most cases, light guiding and scattering rods (1, 3) and enveloping tube (2) are aligned with one another such that their longitudinal axes run substantially parallel to one another.

The light guiding rods (1) consist of a glass having the refractive index $n_1$ and the enveloping tube consists of a glass having the refractive index $n_2$. The scattering rods (3) consist of a glass having the refractive index $n_3$, into which the scattering centres are incorporated. It is preferred if the refractive index $n_3$ of the glass of the scattering rods (3) is greater than the refractive index $n_2$ of the cladding. Particularly preferably, the refractive index $n_3$ of the glass of the scattering rods (3) is exactly equal to or greater than the refractive index $n_1$ of the light guiding rods (1), since the light guided in the light guiding rods (1) can thus pass efficiently into the scattering rods and can thus reach the region in which the scattering centres are present, and a high efficiency of the lateral coupling-out of the light from the glass element can thus be implemented. Especially preferably, both conditions are combined with one another, such that in this case $n_1 \leq n_3 > n_2$ holds true, wherein particularly preferably $n_1 > n_2$ then holds true.

Alongside the illustrated circular diameter form of the light guiding and scattering rods, all further forms, in particular including non-round forms, are encompassed by the invention. In order to obtain a glass element that is under mechanical stress, the glass of the cladding tube (2) is preferably chosen such that its thermal expansion is smaller than that of the glass of the light guiding rods (1). It is likewise possible for the glasses of the light guiding rods (1) to have different coefficients of thermal expansion. The thermal expansion of the scattering rods is advantageously in turn larger than that of the light guiding rods.

During the process of drawing out the preform, a light guiding rod (1) becomes a light guiding element (1) and the enveloping tube (2) becomes the cladding (2) of the glass element. The scattering rods (3) with the incorporated scattering centres become the scattering elements (3) in which the scattering centres are incorporated. As described, in particular the temperature control during the drawing-out process is chosen such that although a non-reasonable connection between the scattering and light guiding elements is achieved, a phase boundary is still present between the light guiding elements (1). However, provision can be made for the cladding glass (2) to have a lower melting point than, in particular, the glass of the light guiding elements (1), with the result that, during the drawing-out process, the enveloping tube (2) melts and settles around the outer light guiding and/or scattering elements (1, 3) of the glass element.

FIG. 4a shows an arrangement of light guiding rods (1) in a preform and within an enveloping tube (2). The arrangement is preferably effected with a hexagonal close-packed structure. For this purpose, the diameters of the light guiding rods (1) and the internal diameter of the tube should be adapted to one another. If an outer contour that is as round as possible is necessary, it is necessary to fill the gaps in the edge region with light guiding rods (11) having an adapted diameter.

FIG. 4b shows the case in which light guiding rods (1) having identical diameters are arranged in a preform within an enveloping tube (2). A hexagonal form arises; in this case, the drawn-out glass element does not necessarily have a round cross section. The presence of scattering rods (3) is unimportant for the consideration of the arrangement in a preform.

In order to produce a side emitting glass element, scattering rods (3) are fitted at suitable locations in the preform in accordance with FIG. 5a. FIG. 5a substantially corresponds to FIG. 4a in which individual light guiding rods (1) have been replaced by scattering rods (3). In the example shown, three scattering rods (3) are introduced in the edge region of the matrix of light guiding rods (1, 11), that is to say that the scattering rods (3) are present in a radially symmetrical edge configuration. A radial illumination profile of the drawn-out side emitting glass element can thus be achieved. In the same way as in FIG. 4a, light guiding rods (1, 11) having different diameters are present in FIG. 5a.

FIG. 5b corresponds to FIG. 4a to the greatest possible extent, except that individual scattering rods in a radially symmetrical central configuration are introduced in proximity to the centre. In this example, the diameters of the scattering rods (3) are considerably smaller than those of the light guiding rods (1). If the preform shown is drawn out, a side emitting glass element which likewise has a radial illumination profile is obtained. A radially symmetrical central configuration is also possible, of course, in the preform in accordance with FIG. 4b, in which light guiding rods (1) having identical diameters are introduced.

Figure 6A:
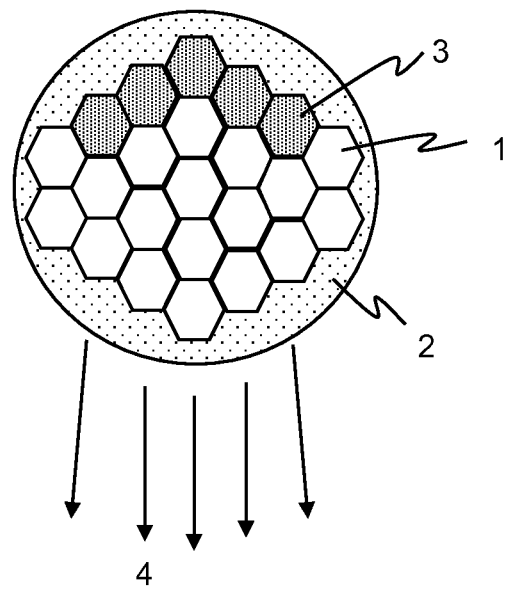
FIG. 6a: shows a section transversely with respect to the longitudinal axis through a side emitting glass element according to the invention with light guiding elements and scattering elements having a directional illumination profile, which are connected in a form-fit manner.

FIG. 6a shows the schematic cross section of a side emitting glass element which was obtained by drawing out a preform described and in which the light guiding elements (1) and scattering elements (3) have a form-fit connection. A hexagonal cross section of the light guiding elements (1) and scattering elements (3) is usually established in this case. In the example, the cladding (2) is melted onto said elements. In the asymmetrical edge configuration of the scattering elements (3) as shown, it is possible to achieve a directional illumination profile in which the side emitting glass element illuminates a strip, in particular.

Figure 6B:
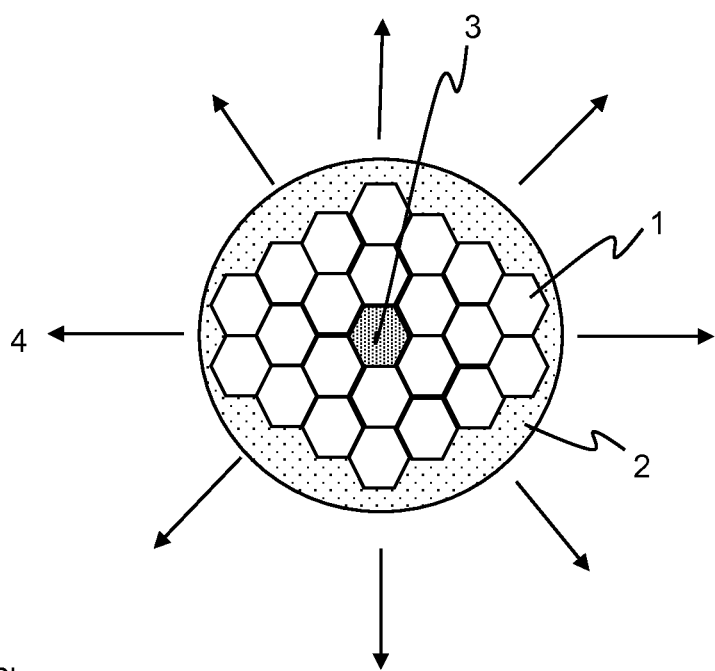
FIG. 6b: shows a section transversely with respect to the longitudinal axis through a side emitting glass element according to the invention with light guiding elements and scattering elements having a radial illumination profile, which are connected in a form-fit manner.

FIG. 6b schematically illustrates the cross section of a side emitting glass element which was obtained by drawing out a preform described and in which the light guiding elements (1) and scattering elements (3) likewise have a hexagonal form-fit connection. A scattering element in a central and thus also radially symmetrical configuration is shown here, which scattering element enables a radial illumination profile.

Figure 7A:
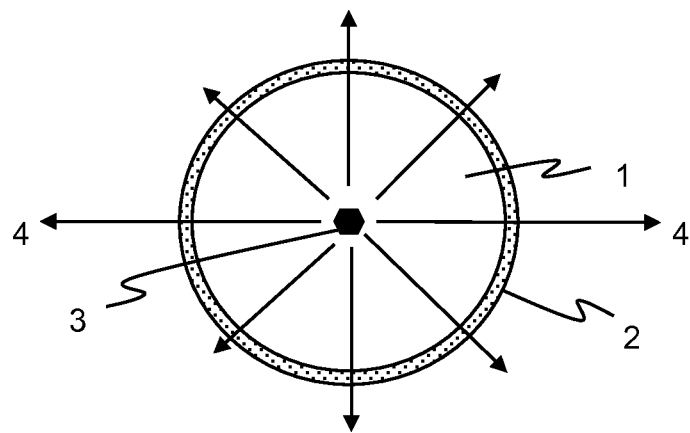
FIG. 7a: illustrates a section transversely with respect to the longitudinal axis through a side emitting glass element according to the invention having a radial illumination profile and a central scattering element.
Figure 7B:
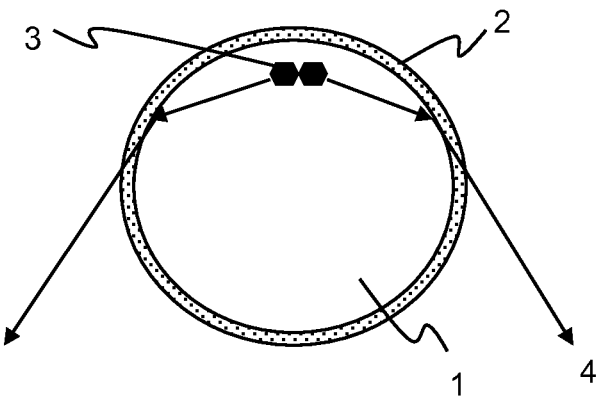
FIG. 7b: illustrates a section transversely with respect to the longitudinal axis through a side emitting glass element according to the invention having a directional illumination profile and scattering elements in an edge configuration.
Figure 7C:
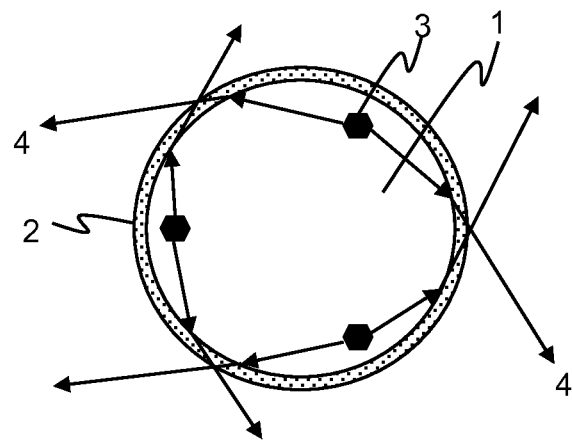
FIG. 7c: illustrates a section transversely with respect to the longitudinal axis through a side emitting glass element according to the invention having a radial illumination profile and scattering elements in an edge configuration.

The ray geometry governed by the arrangement of the scattering elements (3) is dealt with in greater detail in FIGS. 7a, 7b and 7c. The hexagonal form-fit connection of the light guiding and scattering elements is used in the illustration. However, the fundamental considerations also apply to the non form-fit connection. For the sake of clarity, no light guiding elements (1) are depicted here although they are present, of course, in a real component.

FIG. 7a schematically illustrates the central configuration as in FIG. 6b. In the central configuration, the light scattered by the scattering element (3) impinges on the cladding (2) at an angle which is less than the angle of total reflection. Consequently, the light (4) emerges from the glass element and brings about the side emission effect. The result is a non-directional profile of the lateral emission, that is to say a radial illumination profile along the longitudinal axis of the glass element.

FIG. 7b schematically depicts the asymmetrical edge configuration of the scattering elements (3), by means of which a directional illumination profile of the glass element can be produced. The light rays (4) shown represent the marginal rays of the striped illumination profile. The emission angle can be determined by the position of the scattering elements (3).

The radially symmetrical edge configuration in accordance with schematic FIG. 7c represents as it were a special case which makes it possible to obtain a radially particularly homogeneous emission. In an idealized fashion that is the case if the product of critical angle and number of scattering elements (3) yields 360° and said elements lie equidistantly at an identical distance with respect to the axis. It goes without saying that more than the three scattering elements used in FIG. 7c can also be used for this purpose.

FIG. 8 illustrates the interior of an aircraft, for example the cabin of a passenger aircraft. Lighting devices comprising the side emitting glass elements (10) according to the invention can find diverse applications in aircraft cabins. The glass elements (10) are flame-retardant and fulfil the approval provisions of the authorities responsible for the approval of passenger aircraft, and the applicable manufacturer requirements. In FIG. 8, the side emitting glass elements (10) are in some instances illustrated as wide strips. This illustration need not be true to scale. Depending on the requirement, the glass elements (10) are embodied as a narrow rod that appears as a luminous line.

A side emitting glass element (10) according to the invention can be fitted as general lighting of the cabin and/or as contour lighting (10) along and/or around the windows of the aircraft cabin, along and/or around the compartments for storing hand luggage or along and/or around interior dividers. Generally, any form of contour lighting that is producible in particular by hot forming is possible within the aircraft cabin. In the floor of the aircraft cabin, the side emitting glass element (10) can be fitted for marking the paths within the aircraft. This path marking is particularly advantageous for marking the paths to the emergency exits. It is likewise possible to use the side emitting glass element (10) as contour lighting for seats. By means of coupling in light using coloured and/or tunable RGB light sources, it is possible to obtain colour moods, depending on time of day or flight duration. Alongside the decorative effect, these applications have the advantage that, for setting night conditions in the cabin which are used to assist sleep phases for passengers, the ambient light can be reduced, but passengers can still find their seats. It has been recognized that, precisely on long haul flights, introducing sleep phases makes the journey less stressful for passengers. The same applies to different-coloured light moods in different flight phases in which light moods are set for example depending on the passengers' biorhythm. Therefore, more and more importance is being attached to suitable night equipment and light moods adjustable in colour in the interior of aircraft internal cabins.

FIG. 9 shows a lighting device comprising a curved side emitting glass element (10). Light is coupled into the end faces of the glass element (10) by light sources (40) and is guided in said glass element. LEDs, in particular, are suitable as light source (40). In this case, the scattering element (3) is embodied such that it has scattering elements only in sections. The effect of the side emission can therefore be observed only on these sections of the glass element (10). It goes without saying that continuous scattering elements (3) are likewise possible. The bending of the glass element (10) can be produced particularly efficiently by hot shaping. Suitable methods for this purpose are known to the person skilled in the art.

FIG. 10 shows an automobile headlight (120) in which the side emitting glass element (10) performs lighting tasks. In this example, said glass element is arranged as a string below the main headlights (42). Alongside decorative functions, it can realize the tasks as sidelight and/or daytime running light. The application of the side emitting glass element (10) according to the invention in automobile headlights (120) is advantageous since the side emitting glass element (10) is resistant to heat and weathering, which can be intensified by the action of aggressive substances. The side emitting glass element (10) according to the invention is less sensitive to weathering and heat loading than structures composed of plastics used hitherto. Moreover, very much higher light powers can be coupled in.

LEDs, in particular, are likewise suitable for coupling into side emitting glass elements (10) since their small emission area in comparison with incandescent lamps or gas discharge lamps enables efficient coupling-in without a large-volume optical system. Costs, weight and space, inter alia, can thus be saved in an automobile headlight (120). Compared with the fitting of LEDs arranged in a strip-type fashion, the use of a side emitting glass element (10) in automobile headlights (120) has the advantage that the light is emitted homogeneously, with the result that the aesthetically unattractive impression of individual luminous points does not arise, other road users are not disturbed by a large number of luminous points, the luminous effect is largely angle-independent and the number of LEDs is reduced and energy can thereby be saved during the use of the headlight, which can in turn reduce the fuel consumption of the vehicle and thus the $CO_2$ emissions thereof and/or can extend the range of electric vehicles.

Figure 11:
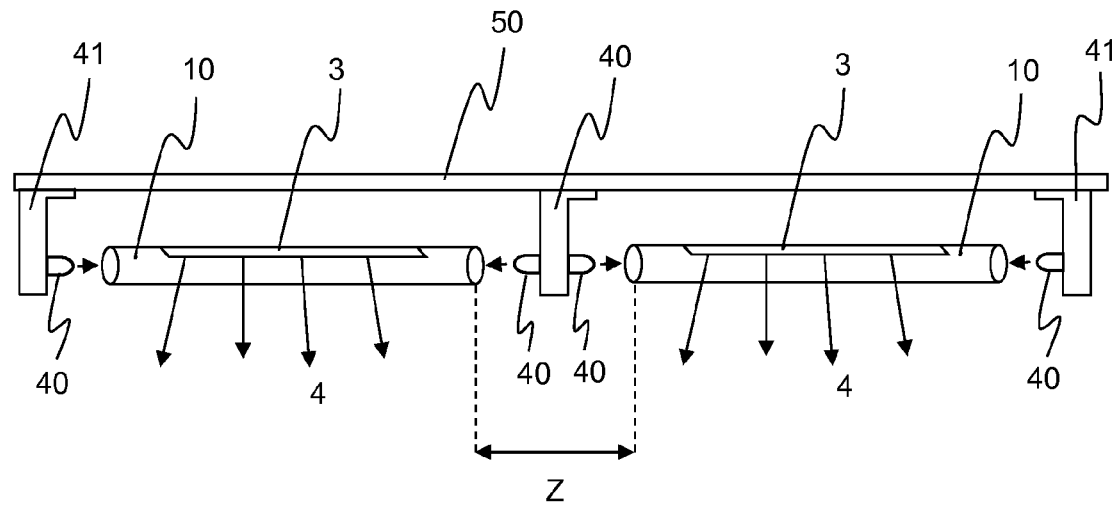
FIG. 11: illustrates a lighting device comprising side emitting glass elements.

FIG. 11 schematically illustrates the preferred mounting of side emitting glass elements (10) according to the invention in a lighting device that can serve as a fluorescent tube replacement. LEDs fitted on carriers (41) serve as light sources (40). The carriers are connected to the mounting body (50). The connection is preferably embodied such that heat conduction from the carriers (41) into the mounting body (50) is possible. The surfaces of the carriers (41) and, in particular, of the mounting body (50) can thus absorb the heat generated by the LEDs (40) in the operating state as a heat sink and, in particular, also emit it again via their surface. Carriers (41) and mounting body (50) can thus serve as cooling bodies.

The mounting body (50) and the carriers (41) are particularly advantageously embodied integrally. They consist, in particular, of a thermally conductive material, e.g. a metal (including alloys of metals). The mounting body (50) can be fitted to other objects. The distance Z between the facing end faces of the glass elements (10) can be chosen to be so small that, at a customary observation distance, the decrease in light between the glass elements (10) is hardly susceptible and the lighting device appears as a luminous strip that is homogeneous to the greatest possible extent.

Figure 12:
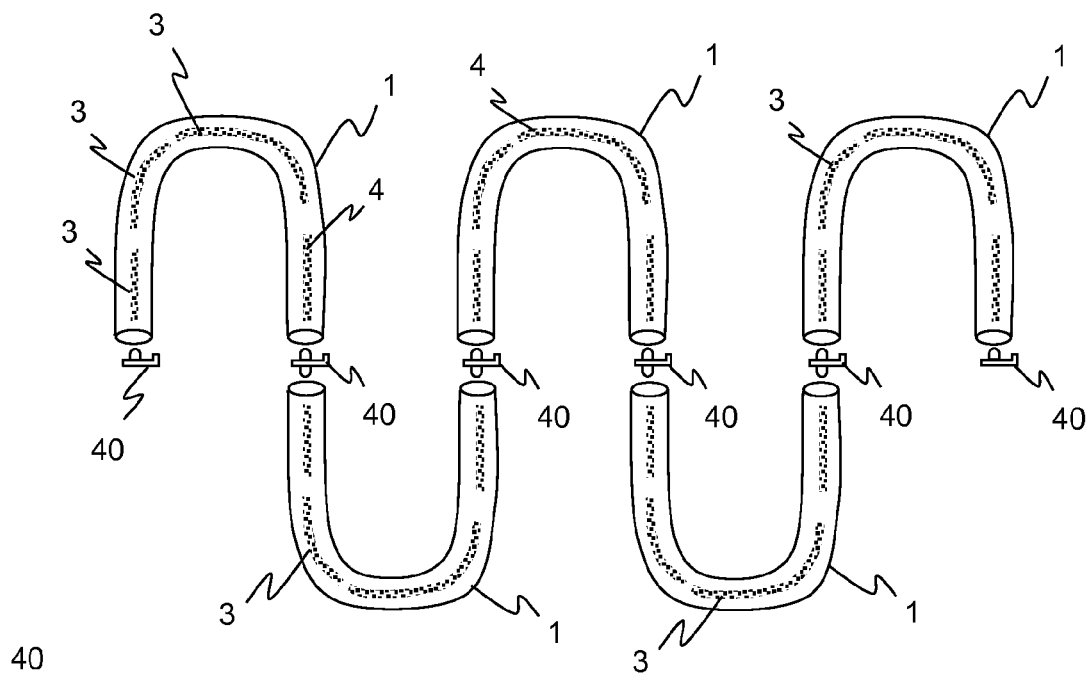
FIG. 12: illustrates a lighting device comprising a chain of side emitting glass elements.

FIG. 12 illustrates the schematic diagram of a chain of side emitting glass elements (10) which substantially correspond to those described in FIG. 9. FIG. 12 is intended to illustrate the fact that the side emitting glass elements (10) according to the invention can be used to produce lighting devices which have arbitrary contours and can be constructed modularly.

Compared with the printed side emitting glass elements known from the prior art, the side emitting glass elements (10) according to the invention have the advantage that they can be brought to virtually any form by means of established hot shaping methods. Printing formed glass gobs would either be impossible on an industrial scale or be associated with untenable outlay. Furthermore, the scattering elements (3) according to the invention are themselves formed by a glass and in addition are protected by the adjacent and/or surrounding light guiding elements (1) and/or preferably also the cladding (2). This makes the side emitting glass elements (10) according to the invention particularly resistant to damage such as can arise for example as a result of scraping on other objects, in particular in case of vibration in aircraft, or alternatively contact with aggressive media. The production method according to the invention makes it possible to scale the side emission effect of the glass element (10) according to the invention and also to realize illumination profiles corresponding to the respective requirements. The side emitting glass element (10) according to the invention also shows a uniform colour profile of the side emitted light, especially with respect to colour homogeneity, also when a large portion of the guided light is emitted through the side.

What is claimed is:
1. A side emitting glass element, comprising:
 a plurality of light guiding elements of a glass having a first refractive index and an outer circumferential surface, the plurality of light guiding elements being inseparably connected to one another at the outer circumferential surfaces so that a phase boundary is present between the plurality of light guiding elements after being drawn; and at least one scattering element inseparably connected to the outer circumferential surface of at least one of the plurality of light guiding elements so that when light is guided in the glass element, a portion of the light is laterally emitted from the glass element, wherein the plurality of light guiding elements are not individually enclosed by cladding glass.

2. The side emitting glass element according to claim 1, wherein, when light is guided in the glass element, the phase boundary provides a balance between a portion of light guided in the plurality of light guiding elements and light passing through the phase boundary and reaching the at least one scattering element.

3. The side emitting glass element according to claim 1, wherein the light guiding elements and the at least one scattering element are connected to one another in a form-fit manner.

4. The side emitting glass element according to claim 1, further comprising an outer circumferential region having a cladding glass, the cladding glass having a second refractive index that is less than the first refractive index.

5. The side emitting glass element according to claim 1, wherein the at least one scattering element is formed by a glass having scattering centers.

6. The side emitting glass element according to claim 5, wherein the scattering centers comprise scattering elements incorporated into the glass.

7. The side emitting glass element according to claim 5, wherein the scattering centers comprise inhomogeneous regions incorporated into the glass.

8. The side emitting glass element according to claim 7, wherein the inhomogeneous regions arise as a result of phase separation and/or segregation of the glass.

9. The side emitting glass element according to claim 1, wherein the at least one scattering element is situated in an edge region of the glass element.

10. The side emitting glass element according to claim 1, wherein the at least one scattering element is surrounded by the light guiding elements.

11. A lighting device comprising at least one light source, which, radiates light through at least one end face of the side emitting glass element according at claim 1 so that the light is guided in the glass element and the portion is laterally emitted from the glass element.

12. The lighting device according to claim 11, wherein at least 50% of the light radiated into the at least one end face is laterally emitted from the glass element.

13. The lighting device according to claim 11, wherein the portion that is laterally emitted has an emission profile determined by arrangement of the at least one scattering element in relation to the plurality of light guiding elements.

14. The side emitting glass element according to claim 1, wherein the plurality of light guiding elements have at least two different diameters.

15. A method for producing a side emitting glass element, comprising:

providing a plurality of light guiding rods having a glass having a first refractive index;

arranging at least one scattering rod having a glass comprising scattering centres such that the plurality of light guiding rods and the at least one scattering rod run parallel to one another to define a preform;

heating the preform;

drawing out the preform to form the side emitting glass element such that outer circumferential surfaces of the plurality of light guiding rods combine inseparably with one another and with the at least one scattering rod so that a phase boundary is produced between the plurality of light guiding rods.

16. The method according to claim 15, wherein the step of arranging the at least one scattering rod comprises arranging the at least one scattering rod depending on a desired location of lateral emission of light.

17. The method according to claim 15, wherein the preform is heated and drawn out at temperatures below a melting point of the glass of the plurality of light guiding rods.

18. The method according to claim 15, wherein the step of providing the plurality of light guiding rods comprises providing the plurality of light guiding elements with at least two different diameters.

* * * * *